United States Patent [19]

Allen et al.

[11] 4,003,652
[45] Jan. 18, 1977

[54] SHUTTER-OPENING PRESETTING MECHANISM FOR MOTION PICTURE COPYING APPARATUS

[75] Inventors: William H. Allen, Bellerose; Dom Capano, Staten Island, both of N.Y.

[73] Assignee: F & B/CECO Industries, Inc., New York, N.Y.

[22] Filed: Feb. 25, 1975

[21] Appl. No.: 552,818

[52] U.S. Cl. .................. 355/71; 354/52; 354/247; 355/77; 355/83; 355/101
[51] Int. Cl.² ............... G03B 9/42; G03B 27/48; G03B 27/78
[58] Field of Search ......... 354/245, 246, 247, 234, 354/226, 52; 355/71, 83, 101, 77

[56] References Cited

UNITED STATES PATENTS

| 1,024,242 | 4/1912 | Atherton | 354/247 X |
| 2,711,121 | 6/1955 | Barsam, Jr. | 355/101 |
| 3,140,645 | 7/1964 | Block et al. | 355/101 X |
| 3,192,458 | 6/1965 | Batterman et al. | 355/101 X |
| 3,504,972 | 4/1970 | Suzuki et al. | 355/71 |
| 3,722,980 | 3/1973 | Craig | 355/83 |
| 3,752,577 | 8/1973 | Grossitite et al. | 355/83 X |

*Primary Examiner*—Joseph F. Peters, Jr.
*Attorney, Agent, or Firm*—Seidel, Gonda & Goldhammer

[57] ABSTRACT

Variation in the width of the shutter opening in a motion picture film copying machine is rapidly effected to control the amount of light passed through the shutter for transmission of the image from the master film onto the blank sensitized film running in registry therewith. Such rapid change in size of the opening in the shutter is effected by presetting the predetermined fixed extent of opening or closing of the opposed shutter halves in advance and shifting these halves to the scheduled predetermined position on signal from a sensor associated with the moving master film strip.

11 Claims, 4 Drawing Figures

SHUTTER-OPENING PRESETTING MECHANISM FOR MOTION PICTURE COPYING APPARATUS

BACKGROUND OF THE INVENTION

This invention relates to the act of reproducing multiple copies from a master motion picture film and is particularly concerned with arrangements whereby the quantity of light permitted to be passed to the film can be automatically and rapidly varied to desired and predetermined extent in programmed sequence.

Multiple copies of the final edited film on which the scenes photographed from life or from cartoon drawings appear, are usually obtained by the industry by contact printing. Such reproduction is accomplished by passing a beam of light through the master film and onto an opposed sensitized blank film running in registry therewith. During such printing it has been the practice in the art to provide the printer with instructions on the quantity or intensity of light to be utilized with each change of scene on the master films, so that variations in density in the exposure being copied can be smoothed out to obtain a well-balanced reproduction for projection purposes. Variations in the quantity or intensity of light passed through is particularly important in printing of color film. In certain industrial applications, an automatic color analyzer programs color adjustments to be made by the printer. These programmed adjustments may be recorded on tape fed to control the color printing, to make density changes as well as color corrections by changing the mix of color densities. In each film copying machine for color printing, the light is divided into its three primary colors: blue, green and red. The intensity of each of these colors, which by their combination in regulated proportions determined the color reproduced, can be controlled to practical extent by increasing or diminishing respectively the light transmitted in the reproduction of each of these colors. The quantity of light contacting the film is readily controlled by regulating the size of the orifice or shutter opening through which the light from a given source is passed. The skilled editor in viewing the original film scene by scene, determines for each scene the best lighting conditions for printing the respective scenes. These conditions are tabulated in various manners known in the industry and the master film is marked with certain identification means at the start of each scene to provide a cue for the printer to apply the prescribed lighting as identified by the editor's tabulation of lighting conditions desired. The prescribed changes in lighting conditions from scene to scene must be made while the running film traverses the light beam which necessitates a degree of rapidity, particularly in short scenes, such that very few frames are permitted to pass before the change is accomplished. Typically with the film moving at the rate of approximately 120 frames per second, the change in light conditions must be achieved in less than 5 milliseconds which corresponds approximately to the time that one-half of a frame passes the beam of light.

Automatic devices for control of certain types of shutter operating mechanisms have been proposed in the past, which rely for the most part on the use of complex and expensive systems of electrical switches and relays. Among the objectives of the present invention is to provide a mechanically operating simple and relatively inexpensive mechanism for effecting rapid and automatic changes in shutter openings on prescribed schedule.

SUMMARY OF THE INVENTION

In accordance with the present invention, the quantity of light to be passed through a shutter is controlled by the width of the opening between opposedly movable shutter halves. These shutter halves are shifted to a preset position fixed in advance, by a single rapid stroke of an associated rounded member sinking into the apex of a cooperating V-shaped groove. The position of the apex of the groove with respect to the rounded member is set in advance of such stroke by the extent of rotation of a cam having an eccentric peripheral curvature, which extent of rotation is predetermined in accordance with the schedule sequence of desired changes in light conditions.

For the purpose of illustrating the invention, there are shown in the drawings forms which are presently preferred; it being understood, however, that this invention is not limited to the precise arrangements and instrumentalities shown.

Figure 1:
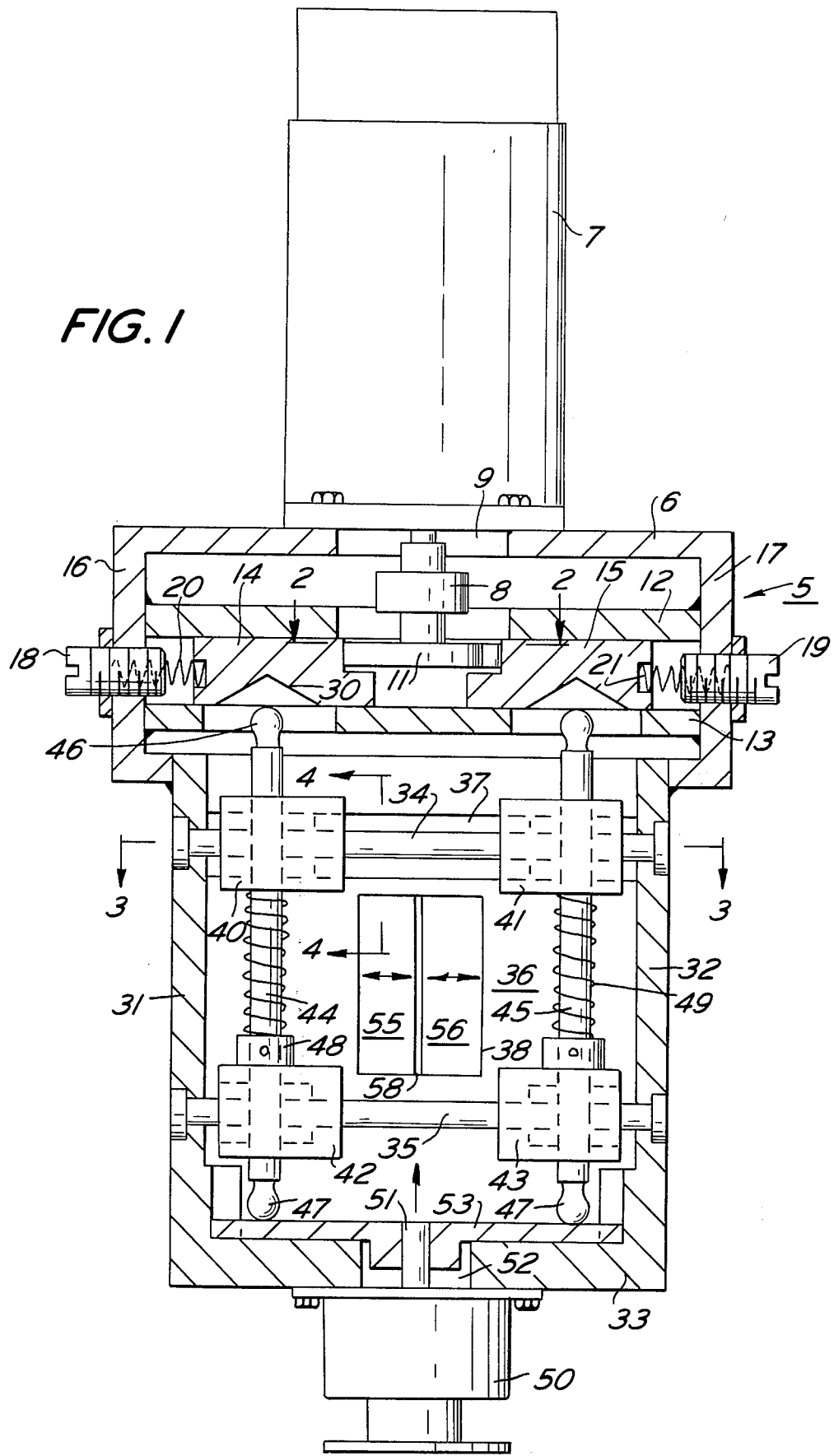
FIG. 1 is a median sectional view taken through the apparatus.

Referring to FIG. 1, there is shown a housing 5 supporting on one of its walls 6 a stepper motor 7. While not limited thereto, in the illustrated embodiment, the device is shown as vertically oriented so that wall 6 constitutes the upper wall of the apparatus. A drive shaft assembly 8 passes through a suitable opening 9 in wall 6, coupling the motor to a double sided cam 11, rotating the cam, when the motor is actuated, in the direction shown in by the arrow in FIG. 2 of the drawings.

Fixedly mounted in the upper portion of the housing below the top wall are spaced parallel plates 12 and 13 forming a horizontal channel or guideway within which opposed slide members 14, 15 are arranged for sliding movement toward and away from the vertical axis of cam 11. The opposite side walls 16, 17 of the upper portion of the housing, at a location between the guide plates 12 and 13, are bored and screw-threaded to receive respectively the corresponding threaded set screws 18, 19. Each of these screws is centrally counter bored at its foot end for a suitable distance to provide a pocket for retaining one end of a coil spring 20. The opposite end of each coil spring is nested in a cavity 21 provided at the outside peripheral edge of each of the slide members 14, 15, so that each of the springs 20 is compressed between the set screw and the opposed slide member to urge the slide member in pressing contact against the circumferential periphery of the cam 11 at diametrically opposite sides thereof.

For easy sliding contact of the members 14, 15 within the guideway formed between the lower surface of the plate 12 and the upper surface of the plate 13, these surfaces may be faced or lined with suitable low-friction material such as Babbitt metal or the like, or they may be polished and graphited.

Figure 2:
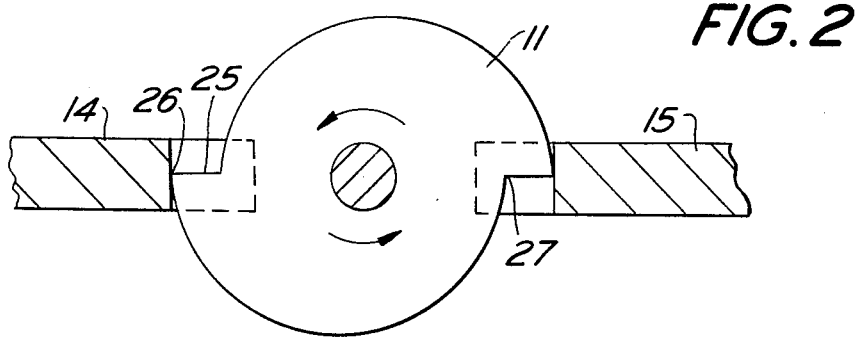
FIG. 2 is an enlarged fragmentary view taken along the line 2—2 of FIG. 1, showing the configuration of the cam.
Figure 3:
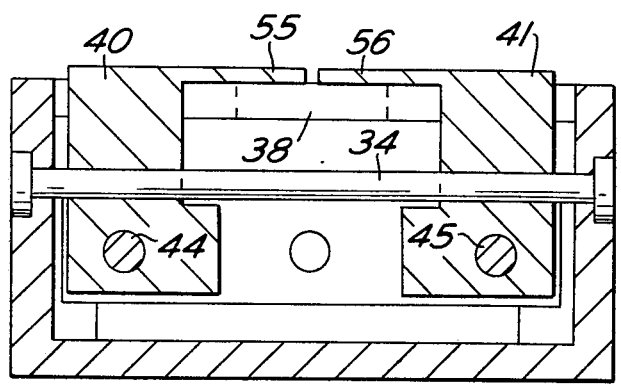
FIG. 3 is a transverse section taken along the line 3—3 of FIG. 1.
Figure 4:
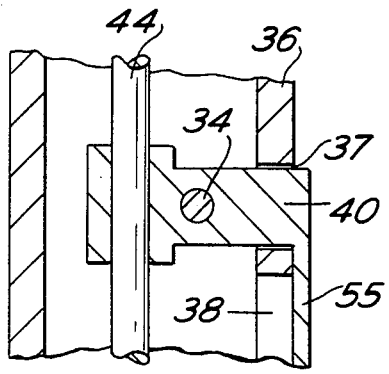
FIG. 4 is a fragmentary section taken along the line 4—4 of FIG. 1 in the direction of the arrows.

Referring now to FIG. 2 particularly, it will be seen that the cam 11 is shaped to provide at the opposite sides thereof identical smooth eccentric surfaces of curvature of logarithmically increasing radial distance from the central axis of the shaft 8 to which the cam is affixed, thus forming at each of the opposite sides of the cam a stepped portion 25 defining the increment between the outermost circumferential edge 26 of the cam at its widest diameter and the innermost circumferential edge 27 at its narrowest diameter. From what has been described so far, it will be appreciated that as the cam is rotated from an initial position in which the respective edges of slide members 14 and 15 contact the cam at the edge surfaces 27 to a position at which the edges of the slide members are in contact with edge surfaces 26 of the cam, the slide members will be progressively moved outwardly away from each other against the opposing force of the springs 20. The length of the stepped portion 25 thus defines the limits of horizontal movement of each of the slide members.

Referring again to FIG. 1, each of the slide members 14, 15 is provided in its base with a triangular notch 30 in the shape of a wide-based inverted V, for purposes which will hereinafter appear.

Below the upper portion of the housing defined by the side walls 16, 17, the lower portion of the housing is shown as having side walls 31, 32 and a bottom wall 33. In the embodiment illustrated, the lower side walls are shown as stepped in a short distance from the side walls 16, 17. Anchored in and extending between the side walls 31, 32 is an upper cross rod 34 and a lower cross rod 35. Also arranged rearwardly of the cross rods and extending between the walls 31, 32 is an upright plate 36 provided with a horizontal slot 37 and an open window portion 38. Mounted to slide on cross rod 34 are block members 40, 41, each having portions extending through the slot 37 in plate 36, so that the slot provides a bearing surface and guideway for the block members 40, 41. Mounted to slide on the lower cross rod 35 are block members 42, 43. The upper and lower surfaces of slot 37 may also be provided with facings or liners for easy sliding but the contact between the block member and its guide should be sufficiently tight to avoid undesired easy displacement of the block member.

Slidably mounted in and extending through the spaced block members 40, 42 is a vertical shaft or rod 44. Similarly mounted and extending through the opposite block members 41, 43 is a vertical rod 45. Each of the rods 44, 45 terminates at its upper end in a locator in the form of a ball-shaped member 46. At its lower extremity, each rod ends in a ball-shaped member 47. While in the illustrated embodiment, stationary ball ends are shown, it will be understood that either or both 46 or 47 may be movable ball bearings suitably anchored in sockets formed at the ends of the rods. It will be noted that the rods 44, 45 are mounted inwardly of the respective walls 31, 32 so that the upper ball ends thereof lie in a vicinity approximately below the V-notches 30 and between the extremities of the base of the corresponding notch.

The bottom blocks 42, 43 are surmounted by collar members 48 adjustably secured to the rods 44, 45. Compressed coil springs 49 surround the rods 44, 45, with the lower end of each spring resting upon a collar 48 and its upper end pressing against the respective block 40, 41. Thus forced upward movement of a rod 44, 45 will compress its associated spring between the affixed collar and the upper block and release of the force will cause the rods to return to position by the energy of the expansion of the spring.

Affixed to the bottom wall 33 of the apparatus is a solenoid 50 having a plunger 51 extending through a suitable opening 52 provided in wall 33. Fixedly attached to the free end of the plunger is a plate 53 normally resting on the inner surface of wall 33. Plate 53 is in contact with the bottoms of lower ball members 47.

From the foregoing description, it will be apparent that when the solenoid 50 is energized to extend plunger 51 outwardly, plate 53 will move upwardly pushing against rods 44, 45 and compressing springs 49 so that the upper balls 46 may enter the grooves 30 by passing through suitable openings in plate 13. On de-energizing the solenoid, the rods 44, 45 will return to their rest position by the expansion of springs 49.

Each of blocks 40, 41 has integrally associated therewith a half-shutter 55, 56, respectively, capable of transverse movement inward and outward across the opening in the plate 36 defining the window 38, as shown by the arrows thereon in FIG. 1. The half-shutters are capable of movement from a fully closed position with their inner edges in contact, outwardly away from each other, thus progressively widening the slit 58 between the halves, which controls the amount of light that will pass through the slit.

The operation of the device is as follows: As explained above, in making multiple projection copies of a motion picture film from a master roll film by contact printing units sensitized transparent blank film running continuously in registry with the unwinding master roll, it is important to control the intensity of the light passed through the film. The change in the amount of light, as determined by frequency resetting of the extent of opening of the shutter, must be accomplished very rapidly and accurately as to the film changes from scene to scene; typically in less than 5 milliseconds. The desired new settings for the shutter at each scene change having been predetermined and programmed, the master film being copied in practice, is impressed with a piece of magnetic tape just before the conclusion of each scene. When the tape passes a detector point a high frequency signal is generated which will energize a mechanism to adjust the shutter opening to the desired light intensity for the oncoming scene.

In the operation of the particular embodiment of the present invention, the solenoid 50 is energized by the generated high frequency signal causing the plunger 51 and affixed plate 53 to move upward, forcing the ball ends 46 to enter the notches 30, which are in a position determined by which portion of the eccentric arc at the periphery of cam 11 is in contact with the adjacent edges of the slide members 14, 15. In entering the V-notches 30, the balls 46 will automatically seek the apexes of the notches striking a slanting walls thereof and thereby sliding the rods 44 and 45 inwardly or outwardly from their previous position, thus causing the slit 58 to be widened or narrowed in accordance with the position set by the cam. Upon conclusion of this sequence of events, the solenoid being de-energized, the plate 53 returns to its normal rest position on the bottom wall 33, permitting the ball ends 46 to be withdrawn from the respective notches 30, under the action of springs 45 pressing against collars 48. The cam 33 is then ready to be rotated to a new position by the stepper motor 7 in advance of and in preparation for the next scene change. Since the intended shutter position for the next coming scene change on the master film has already been preset by the cam and its associated slide members, the shutters can be rapidly moved to that set position by the positive and direct stroke of the rods 44, 45, upon the momentary energizing of the solenoid when receiving the programmed signal.

In a typical programming system, the sequence of settings of the shutter are punched on a tape which can be interpreted automatically by a tape reader in advance of the time set for the change in shutter opening. The output of the tape is stored in memory and fed to the shutter control device. The desired setting for the next approaching scene on the master film is transmitted to the stepper motor 7 of the system according to the present invention, which motor rotates the cam 11 to the predetermined position. An infinite number of shutter settings are thus made possible within the limits of movement of the shutter halves 55, 56 by the extent of rotation of cam 11.

While the control device of the invention has been particularly described in connection with the reproduction of distribution copies from a final master moving picture film, it will be understood that the same may be employed in other photographic systems of reproduction wherein accurate and rapid control of light intensity is desired. For example, such control of light intensity may be employed in making a duplicate negative from an edited film strip. It will also be understood that in systems in which reproduction of the several colors from a master color film is to be accomplished simultaneously in a single printing operation, a separate shutter control mechanism will be employed for each of the primary colors to fix the relative light intensity for each color separately. On the other hand, in those older systems in which each of the primary colors is separately printed by rerolling the film on its reel, a single shutter operating mechanism can be employed, suitably programmed to set the shutter in accordance with the predetermined light intensity desired for that color.

We claim:

1. Control mechanism for rapidly setting the width of opening between linearly movable opposed shutter halves, comprising: a rotatable cam having an eccentric circumferential surface of curvature, opposed slide members in yieldable contact with said circumferential surface at opposite sides thereof, whereby rotation of said cam effects relative movement of said slide members in opposite directions, each of said slide members having a V-shaped groove in a wall thereof, the apex of which groove is located substantially normal to the path of movement of the slide members; separate spaced apart slide blocks mounted for movement toward and away from each other in a path parallel to that of the aforesaid slide members, each of said slide blocks carrying a rod member for integral movement with its associated slide block each of said rod members also being movable relative to its associated slide block in a path normal to the path of movement of said slide block; each said rod member terminating in a ball-shaped forward end normally positioned at rest in an area defined by the width of the base of said V-shaped groove, and said end being normally spaced apart from the sloping walls of said groove; each of said slide blocks also having a shutter half integrally associated for movement therewith; means for rotating said cam through a predetermined distance to fix the position of said slide members and their associated V-shaped grooves; and separate operating means to move said rod members relative to their associated block members in a forward stroke to effect displacement of their ball-shaped ends from normal rest position and causing each such end to impinge upon a sloping wall of an adjacent V-shaped groove and to move along such wall to the apex of the groove, thereby moving its operatively associated slide block and shutter half to a position determined by the spacing between the apexes of the grooves, thus fixing the width of opening between said shutters.

2. Control mechanism as defined in claim 1 wherein said means for rotating said cam comprises a stepper motor.

3. Control mechanism as defined in claim 1 wherein said operating means to move said rod members relative to the block members comprises a solenoid.

4. Control mechanism as defined in claim 1 wherein said operating means to move said rod members comprises a solenoid, a plunger extending from said solenoid for outward movement upon energizing of said solenoid, a plate attached to said plunger for integral movement therewith, the rearward ends of the rod members resting upon said plate, whereby the movement of the plunger is transmitted to said rod members.

5. Control mechanism as defined in claim 4 further characterized in that independent means are provided to move said rods in a return stroke, thereby withdrawing the ball-shaped ends of the rods from the grooves after completion of the forward stroke.

6. Mechanism for variably controlling the intensity of light in photoprinting, comprising opposed reciprocal shutter halves arranged for movement from a fully closed to a fully open position thus determining the width of the slit opening formed therebetween; means for periodically presetting the particular position desired to be occupied by said shutter halves during a prescribed period, and separate mechanical means including a pair of shafts movable in a first path normal to the path of movement of said shutter halves and in a second path parallel to the path of movement of said shutter halves, and a linkage associated with said shafts and responsive to movement of said shafts in said second path to effect movement of the shutter halves from their last occupied position to the aforesaid particular preset position.

7. Mechanism for variably controlling the intensity of light in photoprinting, comprising opposed reciprocal shutter halves arranged for movement from a fully closed to a fully open position thus determining the width of the slit opening formed therebetween; means for periodically presetting the particular position desired to be occupied by said shutter halves during the prescribed period, said presetting means comprising a rotary cam having an eccentric peripheral curvature, said cam being in movable contact with opposed yieldable slide members, and means to rotate said cam through a prescribed arc to fix the relative distance between said slide members, and separate mechanical means including shafts moving in a path normal to the path of movement of said shutter halves operative through associated linkage to effect movement of the shutter halves from their last occupied position to the aforesaid particular preset position.

8. Mechanism as defined in claim 7 wherein said separate mechanical means comprises a pair of sliding blocks, each one of which is operatively associated for integral movement with a shutter half; said sliding blocks being selectively caused to move transversely toward and away from one another under influence of said shafts, said shafts being equipped with mechanical locators for determining the particular position occupied at the time by the opposed slide members of said presetting means; and means for moving said shafts to effect contact between said locators and said slide members, thereby causing said shutter halves to occupy the prescribed position determined by the presetting means.

9. Control mechanism for rapidly setting the extent of opening between opposed shutter halves, comprising:
- a housing having top and bottom walls and side walls;
- a stepper motor supported on said top wall and a solenoid supported by said bottom wall;
- opposed horizontally movable slide members spaced below said motor, a rotary cam operatively connected to said motor for stepped rotation thereby; said cam having a duplicated eccentric surface of curvature at each semi-periphery thereof, each such surface being in spring-pressed engagement with a slide member, whereby rotation of the cam by said motor effects progressive movement of said slide members outwardly against the spring pressure;
- each of said slide members having in the bottom thereof a wide triangular groove having sloping walls intersecting at an apex;
- a cross rod mounted between the side walls below said spring pressed slide members, said cross rod slidably supporting thereon a horizontally spaced pair of blocks; shutter means comprising horizontally movable shutter halves, each shutter half being integrally associated with a block of said pair for simultaneous movement therewith;
- a vertical rod member extending through each block of said pair and slidable therein; spring means associated with each of said rod members urging such rod member downwardly, vertical reciprocable means contacting said rod members at their lower extremities; said reciprocable means being actuated for upward movement by energizing said solenoid thereby effecting upward movement of said rod members against the pressure of their associated spring means;
- said vertical rod members further having arcuate ends at their upper extremities, and said rod members being so located that upon upward movement thereof each said arcuate ends will impinge upon a sloping wall of said triangular groove and travel along said wall to nest at an apex therein; such travel thereby effecting a horizontal component of movement of said rod members imparted to their respectively associated blocks thereby effecting corresponding movement of said shutter halves; the present position of the apexes as determined by the point of contact of the eccentric cam surface with the slide members thereby fixing the horizontal opening between the shutter halves.

10. The method of automatically varying intensity of transmitted light in the photocopying of a continuously moving master film strip under pre-programmed direction by setting of the shutter opening through which light is admitted to said film, which method comprises:
- automatically presetting the desired shutter opening position for a given scene sequence recorded on said master film in advance of exposing such scene to admitted light, automatically sensing the conclusion of the scene preceding said given scene during continuous movement of said film strip, affecting movement of a probe after sensing the conclusion of the scene preceding said given scene to ascertain the preset position schedule for the oncoming given scene, such probing movement being in part along a first path normal to the path of movement of said shutter halves and in a second path parallel to the path of movement of said shutter halves and utilizing the movement in said second path to adjust the shutter to the ascertained preset opening position.

11. Apparatus for rapidly setting the extent of opening between opposed shutter halves, comprising:
- opposed reciprocal shutter halves arranged for movement from a fully closed to a fully open position thus determining the width of the slit opening formed therebetween;
- a pair of rods movable in a first path normal to the path of movement of said shutter halves and in a second path parallel to the path of movement of said shutter halves;
- linkage associated with said shutter halves for effecting movement of said shutter halves in response to movement of said rods in said second path; and
- means for moving said rods along said second path from their last occupied position to a preset position when said rods are moved in said first path.

* * * * *